March 28, 1933.  A. F. McNISH  1,903,223
MEANS FOR CIRCULATING GLASS IN GATHERING BASINS
Filed Sept. 3, 1931

Inventor:
Alexander Francis McNish
By Williams, Bradbury, McCaleb & Hinkle
Attys.

Patented Mar. 28, 1933

1,903,223

UNITED STATES PATENT OFFICE

ALEXANDER FRANCIS McNISH, OF PERTH, SCOTLAND, ASSIGNOR OF ONE-HALF TO JOHN MONCRIEFF LIMITED, OF PERTH, SCOTLAND

MEANS FOR CIRCULATING GLASS IN GATHERING BASINS

Application filed September 3, 1931, Serial No. 560,980, and in Great Britain September 19, 1930.

This invention relates to an improved method of and apparatus for circulating molten glass in a gathering basin associated with a glass furnace or like glass melting pot or tank, charges of glass being periodically withdrawn from the gathering basin.

The invention consists in conveying the glass through the gathering basin in successive charges by means of a series of pockets open at one side for the lateral entry of the glass from the furnace, and each containing an adequate quantity for supplying a gathering device, the several pockets being moved stepwise through the gathering basin so that they are successively moved into a gathering position and remain in such position while glass is being gathered, the remaining glass in the pocket being finally returned to the furnace through the open side of the pocket. The invention further consists in moving the charges of glass through the basin in an orbital path and wiping the glass laterally out of the pockets through the open side thereof in order to clear the pockets of partially cooled glass as they successively leave the gathering position, in order that the partially cooled glass may be swept laterally out of the orbital path and return to the furnace, leaving the pockets ready for the lateral reception of a fresh quantity of glass from the furnace.

The invention also consists in separating the glass into a series of separate successive charges, as it enters the gathering basin from the furnace, by the scooping action of scoops, buckets or like members open laterally and moved stepwise through the gathering basin in an orbital path.

This method avoids surges or waves in the mass of glass at the gathering station and also ensures complete removal of the partially cooled glass from the gathering position before the next gather takes place, each successive gathering operation taking place in a fresh pocketful of glass.

In one manner of carrying out the invention, the gathering basin is open to the furnace at its inner end and at its outer end its inner wall is formed into semi-circular or substantially semi-circular shape in plan view. The basin may widen gradually from the semi-circular portion towards the furnace. Within the basin and rotatably mounted upon a vertical axis is a scoop wheel, star wheel or like rotary member having a series of pockets, recesses or cavities formed laterally in its periphery, said pockets being open at one side and separated from each other by arms or partitions extending radially from the vertical axis of the wheel or like rotary member. The said rotary member revolves intermittently with its periphery in relatively close proximity to the semi-circular wall of the basin, sufficient space being allowed between the periphery of the rotary member and the semi-circular wall of the basin to enable glass in the said space to remain sufficiently warm. The scoop wheel, star wheel or like rotary member may alternatively be in the form of an upright fluted cylinder, the flutes or pockets being relatively wide and concave in plan view and being either open or closed at the bottom. The scoop wheel, star wheel, rotary cylinder or like rotary member may have three or more arms or partitions, thus providing a series of three or more open-sided pockets.

If the pockets are closed at their lower ends, the scoop wheel, star wheel or cylinder or like rotary member may be alternately raised and lowered, so as to lower the pockets into the molten glass entering the basin and raise the glass up to the gathering device, thus enabling the apparatus to be independent of the level of the glass in the furnace being maintained nearly constant. The rotary member may be raised and lowered by any suitable gearing.

The star wheel or like rotary member is intermittently rotated in one direction and if necessary may be raised and lowered by means of any suitable gearing, in such manner that each pocket is brought successively into a position midway of the semi-circular bend in the gathering basin, in which position glass is gathered from the pocket. During or immediately before or after the gathering operation, the glass in the pocket (or in one of the pockets) which is situated in advance of the gathering position is swept laterally out of the pocket into the furnace. A fresh quantity of glass also flows from the furnace laterally into the pocket (or one of the pockets) behind the gathering position.

The glass may be swept laterally out of the pockets by means of a wiper or sweep arm projecting radially from an upright shaft, the wiper or sweep arm being so positioned as to be capable of sweeping through the pocket after it has left the gathering position and is in a position in which it is open to the furnace. To enable the wiper or sweep arm to be moved clear of the periphery of the scoop wheel or like rotary member during the rotation of the latter, the sweep shaft may be situated just clear of the circular path of the scoop wheel or like member and the sweep arm may be given either a continuous rotation, timed to sweep each pocket in succession, or it may be lifted vertically at the end of the sweep stroke and either rotated or angularly oscillated, while so lifted, to enable it to be lowered into the next pocket in readiness for the next sweep stroke.

If the scoop wheel or like member is raised and lowered to raise and lower the charge of glass, the wiper or sweep arm may be also caused to rise and fall therewith.

The star wheel or like member and the wiper or sweep arm may be driven in timed relation with the gathering devices, so that fresh charges of glass will be successively brought into the gathering position in regular sequence with and simultaneously with the movements of the gathering devices into the gathering position.

The present invention enables the glass in the gathering basin to be completely covered in except for a small aperture at the gathering position, thus enabling the basin to be advantageously adapted to gathering devices of the kind which move vertically downwards at the gathering station and gather by suction. The gathering basin may extend outwards to such an extent from the furnace that the scoop wheel or like member rotates entirely within the basin, in which case the wiper or sweep arm may be either rotated or given an angular oscillatory motion as already described, or the basin may be shortened to such an extent that the scoop wheel or like member travels partly within the furnace proper, in which case the wiper or sweep arm may be clear of the furnace wall and thus permit of continuous rotation of the wiper or sweep arm.

From the foregoing description it will be apparent that the invention may be carried out in various ways and the accompanying drawing, to which reference is hereinafter made, is given only as one example of the manner in which the invention can be carried into effect.

Fig. 1 of the accompanying drawing is a front view of the gathering station of a glass furnace with part of the gathering basin broken away to show the scoop wheel and wiper and with the cover of the basin removed.

Figure 1:
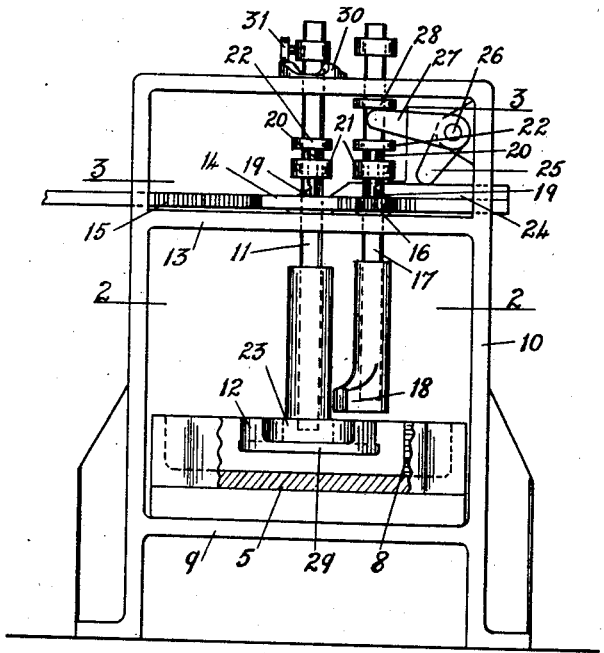

Referring to the drawing, the furnace 4 is provided at the front with a gathering basin 5 which is open at its inner end to the furnace and has its outer end formed by a semicircular wall 6. The interior of the basin widens out towards the furnace as shown, and at one side it is provided with a transverse wall or dam 7 which extends to the top of the basin. The front face 8 of the wall 7 slopes downwards until it merges into the bottom of the basin 5 in order to clear the wiper in its movement as hereafter described. The gathering basin 5 is supported on the cross brace 9 of an upright metal frame 10 which rests on a suitable foundation in front of the furnace. The frame 10 is suitably braced across to provide bearings for a vertical shaft 11, to the lower end of which is fixed a refractory scoop wheel 12. Freely rotatable on the shaft 11 and resting on a cross-brace 13 is a toothed quadrant 14 which meshes with a horizontal rack 15 movable at its ends through bearings in the frame 10 and adapted to be reciprocated by connection (in manner not shown) to a gathering machine in such a manner that the rack 15 makes one complete reciprocation in the interval of time in which a gathering device over the gathering basin 5 is replaced by the next succeeding gathering device. The rack 15 also meshes with a pinion 16 freely rotatable upon a vertical spindle 17 which carries at its foot a refractory wiper 18. The pinion 16 rests on the cross brace 13 and the spindle 17 is carried in bearings in the frame 10. A one-way clutch motion device of any suitable construction connects the quadrant 14 to the shaft 11 and a similar one-way clutch connects the pinion 16 to the spindle 17, the two clutches being of opposed directions so that reciprocation of the rack in the direction of the arrow B revolves the shaft 11 while the spindle 17 does not rotate, and reciprocation of the rack 15 in the opposite direction (arrow A) rotates the spindle 17 while the shaft 11 remains stationary. As an example, a one-way clutch is shown consisting of a ratchet tooth 19 on the quadrant 14 and pinion 16 respectively, and a plurality of dogs 20 which pass through fixed collars 21 on the shaft 11 and spindle 17 respectively, the dogs 20 being carried by sliding collars 22. It will be apparent that, in one direction of movement, the ratchet tooth 19 will ride under and merely lift the dogs 20, while in the other direction of movement, the ratchet tooth 19 will drive one of the dogs 20 before it and will thus rotate the collar 21 fixed on the shaft 11 or spindle 17.

Figure 2:
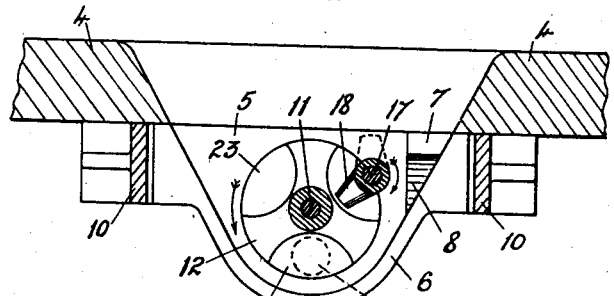
Fig. 2 is a horizontal sectional view on line 2—2 of Fig. 1.
Figure 3:
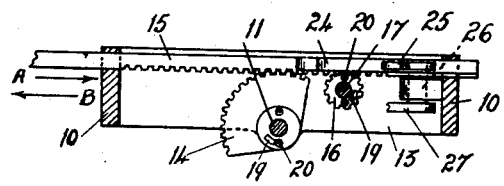
Fig. 3 is a horizontal sectional view on line 3—3 of Fig. 1.

In the construction illustrated, the scoop wheel 12 has three cavities 23 and the shaft 11 is consequently arranged to turn in the direction of the arrow in Fig. 2 through 120 degrees when the rack makes its stroke in direction of arrow B while the shaft 17 does not rotate. The shaft 17 is arranged however to make a complete revolution in direction of arrow in Fig. 2 when the rack 15 makes its stroke in direction of arrow A, while the shaft 11 remains stationary. In order to allow the wiper 18 to clear the wall 7, it is alternately raised and lowered, for example by means of a cam bar 24 on the rack 15, the cam bar 24 cooperating with the end of a lever 25 fixed on a stub shaft 26, which carries a lever 27 engaging a collar 28 on the spindle 17. When the wiper 18 is not rotating, it is thus raised clear of the scoop wheel 12, and during rotation of the wiper it rides down just clear of the sloping wall 8 into the basin 5.

The pockets or cavities 23 in the scoop wheel 12 may be closed at the bottom by forming the cavities 23 only partly through the scoop wheel 12, so as to leave the scoop wheel with a circular base 29. The shaft 11 may be raised and lowered during its intermittent rotation, in order to raise and lower the scoop wheel within the glass, and for this purpose a fixed crown cam 30 is shown, upon which rides a roller 31 carried round with the shaft 11 and arranged to be lifted by the cam 30 when the cavities 23 are in the gathering position immediately beneath a gathering device indicated by the dotted circle C in Fig. 2 in order to raise the charge of glass to the same level for every gather.

The gathering basin 5 may be completely covered in by a refractory arch except for apertures for the passage of the shaft 11 and spindle 17 and except for an aperture at the gathering position sufficient to enable a gathering device to be inserted. It will be noted also that the gathering device draws its supply of glass from a chamber formed between the walls of the cavity 23 and the outer wall 6 of the basin 5 and that the charge of glass confined in this chamber is almost entirely segregated from the glass in the basin 5 and especially from the partially cooled glass remaining from the preceding gathering operation. This segregation of the charge at the gathering position from the remaining supply of glass is a feature of the present invention.

I claim:

1. The combination with a glass furnace, of a gathering basin open to the furnace, a series of conveying means having a scoop-like effect open laterally for the reception of the glass, and means for successively moving said conveying means stepwise all around in the gathering basin in an orbital path.

2. The combination with a glass furnace, of a gathering basin open to the furnace, a rotary wheel mounted on a vertical axis within said gathering basin and having lateral cavities formed in its periphery, and means for intermittently rotating said wheel.

3. The combination with a glass furnace, of a gathering basin open to the furnace, a rotary wheel mounted on a vertical axis within said gathering basin and having lateral cavities formed in its periphery, said cavities being concave in plan view, and means for intermittently rotating said wheel.

4. The combination with a glass furnace, of a gathering basin open to the furnace, a series of conveying means having a scoop-like effect open laterally for the reception of the glass, and closed at the bottom, and means for successively moving said conveying means stepwise all around in the gathering basin in an orbital path.

5. The combination with a glass furnace, of a gathering basin open to the furnace, a series of conveying means having a scoop-like effect open laterally for the reception of the glass, means for successively moving said conveying means stepwise all around in the gathering basin in an orbital path and mechanism for raising the conveying means at a gathering position and for lowering them into the glass where it enters the basin.

6. The combination with a glass furnace, of a gathering basin open to the furnace, a series of conveying means having a scoop-like effect open laterally for the reception of the glass, means for successively moving said conveying means stepwise all around in the gathering basin in an orbital path and a wiping device for wiping the glass out of the conveying means after they have left the gathering position.

7. The combination with a glass furnace, of a gathering basin open to the furnace, a series of conveying means having a scoop-like effect open laterally for the reception of the glass, means for successively moving said conveying means stepwise all around in the gathering basin in an orbital path and a wiping device for wiping the glass out of the conveying means after they have left the gathering position, said wiping device projecting radially from any upright shaft, and means for moving said wiper about the axis of the shaft in timed relation to the stepwise progression of the conveying means.

8. The combination with a glass furnace, of a gathering basin open to the furnace, a series of conveying means having a scoop-like effect open laterally for the reception of the glass, means for successively moving said conveying means stepwise all around in the gathering basin in an orbital path and a wiping device for wiping the glass out of the conveying means after they have left the gathering position, said wiping device projecting radially from any upright shaft, means for moving said wiper about the axis of the shaft in timed relation to the stepwise progression of the conveying means, and means for alternately lowering said wiping device into and raising it clear of the conveying means in timed relation to their stepwise progression.

9. The combination with a glass furnace, of a gathering basin open to the furnace, a series of conveying means having a scoop-like effect open laterally for the reception of the glass, and means for successively moving said conveying means stepwise all around in the gathering basin in an orbital path in timed relation with gathering devices moved in regular sequence into the gathering position.

10. Apparatus for circulating molten glass in a gathering basin comprising a series of conveying means having a scoop-like effect open laterally for the reception of glass, and mechanism for moving them successively and in a stepwise manner all around in an orbital path.

11. Apparatus for circulating molten glass in a gathering basin comprising a rotary wheel having cavities formed laterally in, and extending to the top level of its periphery, a shaft on which said wheel is positively carried, and mechanism for intermittently rotating said wheel.

12. Apparatus as claimed in claim 11 in combination with a wiper, and mechanism interrelated with the wheel rotating mechanism for moving said wiper about an axis to cause it to sweep through each cavity of the wheel in succession.

13. The combination with a gathering basin for molten glass, of means for conveying the molten glass from the inlet region of said basin to the part thereof where the glass is to be gathered, said means including a series of laterally open pockets.

14. The combination with a gathering basin for molten glass, of means for conveying the molten glass from the inlet region of said basin to the part thereof where the glass is to be gathered, said means including a series of laterally open pockets and means for intermittently moving said pockets in an orbital path so as to circulate the molten glass in said basin.

15. In a device as claimed in claim 13, a series of laterally open cavities having vertical edges adapted to cut into the mass of molten glass and to push said glass around with a scoop-like action.

16. In a device as claimed in claim 13, a series of laterally open cavities and means for removing any glass remaining in said cavities as they leave the gathering position.

17. The combination with a glass melting apparatus and a gathering basin communicating therewith, of scoop-like means adapted to circulate the molten glass between said apparatus and said basin in a series of separate charges and to convey said charges successively to a position registering with a gathering device operating in said basin.

18. In a device as claimed in the preceding claim, means adapted to clean said scoop-like means by an arcuate sweeping movement after said scoop-like means have passed the gathering position.

19. The combination with a gathering basin for molten glass, of a rotating member in said basin provided with a series of cavities, means for intermittently stopping said rotating member when any of said cavities is in registering position with a gathering device in said basin, and means for conveying the molten glass throughout the said basin in a series of charges practically confined between the walls of said basin and each of said cavities, so that each charge be almost completely segregated from the remainder of the glass in the basin and particularly from the partially cooled glass remaining from the preceding gathering operation.

In testimony whereof I affix my signature.

ALEXANDER FRANCIS McNISH.